(12) United States Patent
Rozmarynowski et al.

(10) Patent No.: US 9,623,510 B2
(45) Date of Patent: Apr. 18, 2017

(54) INTEGRATED ELECTRODE DRYER

(71) Applicant: Hobart Brothers Company, Troy, OH (US)

(72) Inventors: Scott Ryan Rozmarynowski, Greenville, WI (US); Brian Scott Bashore, Tipp City, OH (US)

(73) Assignee: HOBART BROTHERS COMPANY, Troy, OH (US)

( * ) Notice: Subject to any disclaimer, the term of this patent is extended or adjusted under 35 U.S.C. 154(b) by 1081 days.

(21) Appl. No.: 13/783,876

(22) Filed: Mar. 4, 2013

(65) Prior Publication Data
US 2014/0246413 A1    Sep. 4, 2014

(51) Int. Cl.
| | | |
|---|---|---|
| *B23K 9/09* | (2006.01) | |
| *B23K 9/10* | (2006.01) | |
| *B23K 9/12* | (2006.01) | |
| *B23K 9/28* | (2006.01) | |
| *B23K 9/26* | (2006.01) | |
| *B23K 9/32* | (2006.01) | |
| *F26B 9/00* | (2006.01) | |

(52) U.S. Cl.
CPC ............ *B23K 9/28* (2013.01); *B23K 9/1006* (2013.01); *B23K 9/26* (2013.01); *B23K 9/32* (2013.01); *B23K 9/327* (2013.01); *F26B 9/003* (2013.01)

(58) Field of Classification Search
CPC .......... B23K 9/1006; B23K 9/26; B23K 9/28; B23K 9/32; B23K 9/327; F26B 9/003
USPC .................... 219/137 PS, 130.1, 133, 134
See application file for complete search history.

(56) References Cited

U.S. PATENT DOCUMENTS

| | | | |
|---|---|---|---|
| 2,253,403 A | 8/1941 | Steinert | |
| 3,309,492 A | 3/1967 | Dallas | |
| 3,350,535 A | 10/1967 | Simon | |
| 3,424,892 A | 1/1969 | Wilcox | |
| 3,787,655 A | 1/1974 | Anderson | |
| 5,266,772 A * | 11/1993 | Reed ........................ | B23K 9/32 |
| | | | 150/161 |
| 6,075,226 A * | 6/2000 | Kishbaugh ............... | B23K 9/24 |
| | | | 219/133 |
| 6,528,764 B2 * | 3/2003 | Podgurski ................ | B23K 9/32 |
| | | | 219/133 |
| 6,992,266 B1 | 1/2006 | Di Novo | |
| 2003/0136773 A1 | 7/2003 | Bogner | |

(Continued)

FOREIGN PATENT DOCUMENTS

| | | |
|---|---|---|
| CN | 1701889 | 11/2005 |
| CN | 1938119 | 3/2007 |

(Continued)

OTHER PUBLICATIONS

International Search Report from PCT application No. PCT/US2014/014247, dated Jun. 5, 2014, 8 pgs.

(Continued)

*Primary Examiner* — Dana Ross
*Assistant Examiner* — Lindsey C Staubach
(74) *Attorney, Agent, or Firm* — Fletcher Yoder P.C.

(57) ABSTRACT

A welding system includes a welder configured to output power to form an arc between a stick electrode and a workpiece. The welder includes a compartment configured to receive and store additional stick electrodes, and the welder is configured to heat the additional stick electrodes stored in the compartment.

18 Claims, 4 Drawing Sheets

(56) References Cited

U.S. PATENT DOCUMENTS

| | | | |
|---|---|---|---|
| 2004/0173613 A1 | 9/2004 | Schroeder | |
| 2004/0182845 A1 | 9/2004 | Crisler | |
| 2005/0155959 A1 | 7/2005 | Bender | |
| 2005/0168002 A1 | 8/2005 | Herring | |
| 2005/0258155 A1 | 11/2005 | DeYoung | |
| 2007/0090163 A1 | 4/2007 | Di Novo | |
| 2008/0011729 A1 | 1/2008 | Brietbach | |
| 2008/0078753 A1 | 4/2008 | Fulcer | |
| 2009/0277882 A1 | 11/2009 | Bornemann | |
| 2011/0284513 A1* | 11/2011 | Rappl | B23K 9/0008 219/130.1 |
| 2014/0246413 A1 | 9/2014 | Rozmarynowski | |

FOREIGN PATENT DOCUMENTS

| | | |
|---|---|---|
| CN | 101374627 | 2/2009 |
| CN | 101419755 | 4/2009 |
| CN | 102133672 | 7/2011 |
| EP | 1247609 | 10/2002 |
| GB | 1057211 | 2/1967 |
| GB | 1157968 | 7/1969 |
| GB | 2044655 | 10/1980 |
| JP | S5956998 | 4/1984 |
| JP | H02192879 | 7/1990 |

OTHER PUBLICATIONS

International Search Report from PCT application No. PCT/US2014/017219, dated Aug. 12, 2014, 12 pgs.

\* cited by examiner

INTEGRATED ELECTRODE DRYER

BACKGROUND

The invention relates generally to welding systems and, more particularly, to a shielded metal arc welding (SMAW) system with an integrated electrode dryer.

Welding is a process that has increasingly become ubiquitous in various industries and applications. While such processes may be automated in certain contexts, a large number of applications continue to exist for manual welding operations. Welding systems generally include an electrode configured to pass an arc between a torch and a workpiece, thereby heating the workpiece to create a weld. In shielded metal arc welding (SMAW), or stick welding, the electrode is a consumable rod that melts into the weld to provide a filler material into the weld. Several electrodes are often consumed during a single welding session, so welding operators generally bring a supply of electrodes with them to the worksite.

Once an electrode is exposed to the air, moisture from the air can enter the electrode, degrading a flux coating of the electrode. Such degradation can lead to undesirable welding performance or weld characteristics. It is possible to remove moisture from the electrodes after they are exposed to the air by heating the electrodes to a high temperature, thereby drying the electrodes. Existing electrode dryers or ovens usually include a heating coil wrapped around a container that holds the electrodes. Unfortunately, these existing systems for drying electrodes have several disadvantages. For example, electrode dryers usually require 120 V or 240 V power to operate, and a power source may not be readily available at the worksite. In addition, it can be difficult to transport a portable electrode dryer to a worksite along with the other welding equipment needed for the welding process.

BRIEF DESCRIPTION

In a first embodiment, a welding system includes a welder configured to output power to form an arc between a stick electrode and a workpiece. The welder includes a compartment configured to receive and store additional stick electrodes, and the welder is configured to heat the additional stick electrodes stored in the compartment.

In another embodiment, a welder includes a fan configured to directed air through a cabinet of the welder. The cabinet encompasses circuitry for operating the welder. The welder also includes a compartment configured to store welding electrodes. In addition, the welder includes a structure configured to direct a portion of the air from the cabinet to the compartment to heat the welding electrodes stored in the compartment.

In a further embodiment, a method includes receiving one or more electrodes into a compartment of a SMAW power supply. The method also includes drying the one or more electrodes in the compartment via heat from the SMAW power supply.

DRAWINGS

These and other features, aspects, and advantages of the presently disclosed embodiments will become better understood when the following detailed description is read with reference to the accompanying drawings in which like characters represent like parts throughout the drawings, wherein.

DETAILED DESCRIPTION

Traditional electrode dryers, which are used to dry stick electrodes used in shielded metal arc welding (SMAW) systems, are generally provided separately from the components of the welding system. For example, the dryer may be portable, but only as a separate component that is carried in addition to a welding power supply and other equipment. It may be desirable and more efficient to provide SMAW systems with electrode dryers that are integrated into pre-existing components of the welding system. Thus, presently disclosed embodiments are directed to storing and drying welding electrodes integrally with a power supply of the welding system. The power supply may include a compartment built into its body, or a handle, where the compartment is configured to receive and hold one or more welding electrodes. The power supply may utilize convective heat transfer to heat the welding electrodes stored in the compartment. For example, the power supply may include a fan that draws air into the power supply and directs the air over circuitry of the power supply. This air cools the circuitry, and heat transfers from the circuitry to the air. The heated air may then be blown across the welding electrodes in the compartment to dry the electrodes. Some embodiments of the power supply may include a heating element to heat the welding electrodes stored in the compartment. The heating element may be located within, and be entirely powered by, the power supply. The disclosed embodiments allow an operator to dry welding electrodes at a worksite without employing a separate electrode dryer. This may improve the ease of transportation of welding equipment to the worksite, eliminate the need for a separate power source at the worksite, and reduce costs of the welding equipment. Because the electrodes can be dried integrally with the other welding equipment, they are available for use wherever the equipment is located.

Figures 1, 2:
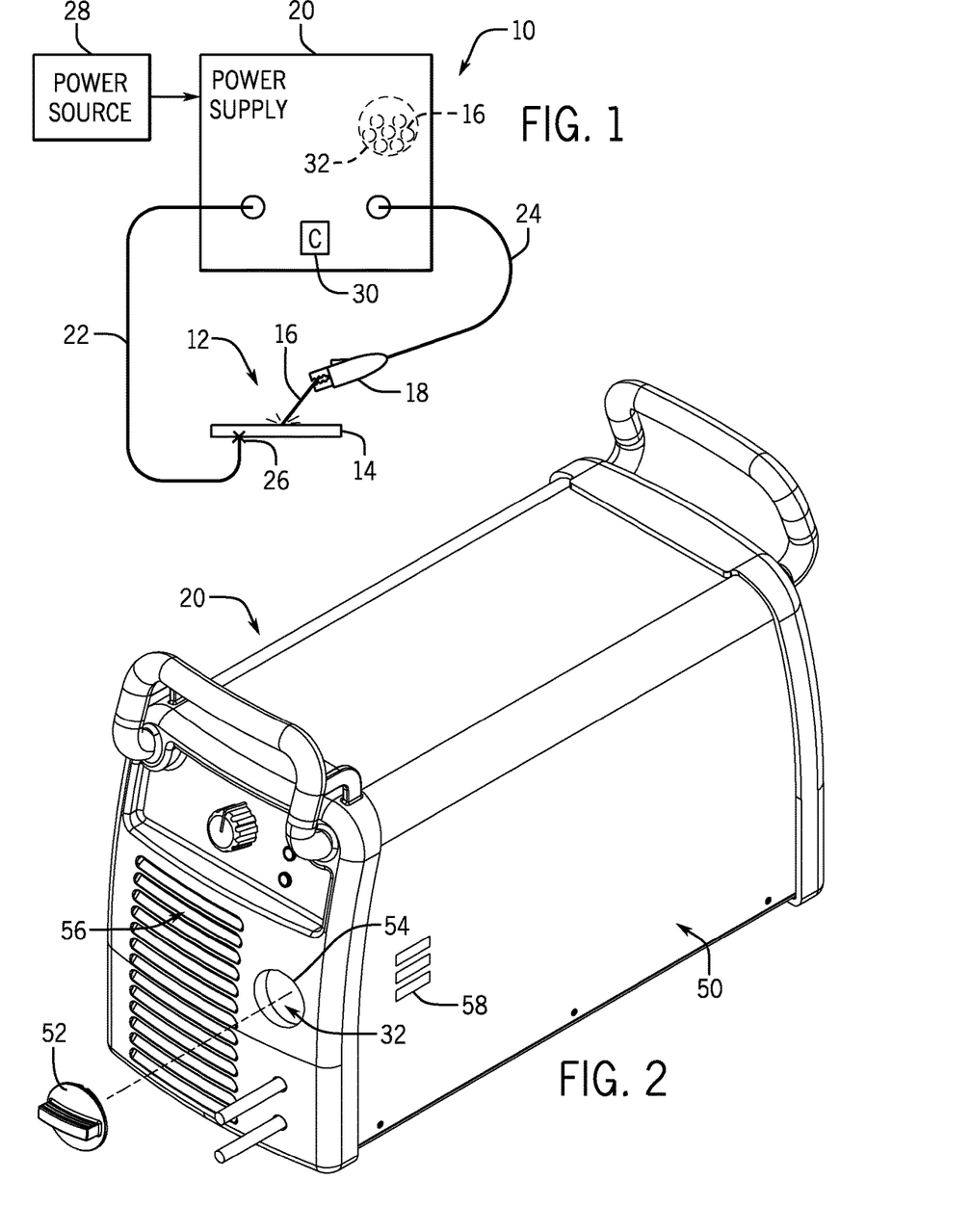
FIG. 1 is a diagrammatical representation of an embodiment of a welding system having an electrode dryer integral with the power supply.
FIG. 2 is a perspective view of an embodiment of the power supply of FIG. 1.

Turning now to the drawings, FIG. 1 is a diagrammatical representation of an embodiment of a welding system 10 configured to store and dry welding electrodes. The welding system 10 is a SMAW system used to produce an electric arc 12 for heating a workpiece 14 via a consumable welding electrode 16. The electrode 16, also referred to as a "stick electrode", may include a metal core wire with a flux coating of various materials. Power is supplied to the metal core wire to produce the arc 12, which heats the workpiece 14 and melts the wire into a weld puddle formed on the workpiece 14. The flux coating may provide an atmospheric shield of the weld area, reduce weld contaminants, direct and stabilize the arc 12, produce a weld bead with a desired chemical composition, and so forth. An operator may manipulate the electrode 16 in relation to the workpiece 14 via an electrode holder or clamp 18. A welding power supply 20 (i.e., a "welder") provides electricity through weld cables 22 and 24 to produce the arc 12. For example, in some welding operations, the power supply 20 provides an electrical current through the weld cable 22 to a clamp 26 coupled to the workpiece 14. The current arcs from the workpiece 14 to the electrode 16, and returns to the power supply 20 through the clamp 18 and the weld cable 24. In some welding processes, the current may flow in the opposite direction.

A welding process (AC or DC) may be used to produce the desired weld, and the power supply 20 converts input power from a power source 28 to the desired power output. The power source 28 may represent the power grid, although other sources of power may also be used, such as power generated by an engine-driven generator, batteries, fuel cells, or other alternative sources. The power supply 20 includes circuitry 30, which may include power conversion circuitry, control circuitry, operator interface circuitry, and so forth. This circuitry 30 is configured to produce power that is suitable for welding.

Present embodiments of the power supply 20 are configured to store and dry electrodes 16 for use in the welding process. The electrodes 16 may be located, for example, in an interior compartment 32 formed within the power supply 20, as shown. Upon depositing an entire electrode 16 onto the workpiece 14, an operator may select another electrode 16 from the compartment 32, insert the new electrode 16 into the clamp 18, and continue welding.

Exposure of the electrodes 16 to air and moisture can negatively affect weld performance, particularly due to degradation of the flux coating. For example, the electrodes 16 may absorb moisture when exposed to the atmosphere, and such moisture in the electrodes can lead to undesired porosity within the weld. Therefore, it may be desirable to include a system for drying the electrodes 16 at the worksite to remove moisture from the electrodes 16. In presently disclosed embodiments, such drying systems are integral with the power supply 20. For example, the power supply 20 may be configured to heat the electrodes 16 stored in the compartment 32. Thus, the electrodes 16 stored in the illustrated power supply 20 may be dried wherever the power supply 20 is located, and no additional dryer or oven is required.

FIG. 2 is a perspective view of an embodiment of the power supply 20 used to dry the electrodes 16. In the illustrated embodiment, the power supply 20 includes the compartment 32 configured to receive and hold the electrodes 16. It should be noted that, in present embodiments, the compartment 32 is specifically dimensioned to receive and hold the electrodes 16. That is, the compartment 32 extends far enough in a longitudinal direction to receive the electrodes 16 fully within the compartment 32. For example, the length of the compartment 32 may fall within a range of approximately 13-15 inches to accommodate the electrodes 16. The compartment 32 may also have a large enough width or diameter dimension to accommodate a supply of approximately 1 to 10 pounds of electrodes 16. Depending on the type of electrodes 16 used, this width or diameter dimension may be within a range of approximately 1.5-5 inches, 2.5-4.5 inches, or 3-4 inches. It should be noted that the compartment dimensions are not limited to the examples given above.

The compartment 32, as shown, may be located in a body 50 or chassis of the power supply 20. The power supply 20 may be designed so that the compartment 32 for storing and drying the electrodes 16 is separated from the circuitry 30 configured to produce the welding power output. In some embodiments, the compartment 32 may be thermally insulated so that drying heat provided to the compartment 32 does not dissipate into other portions of the power supply 20 (e.g., to the circuitry 30). In the illustrated embodiment, the compartment 32 includes a cylindrical tube extending into the body 50 of the power supply 20, but other shapes and arrangements may be possible as well. In addition, the power supply 20 may include a removable cap 52 that acts as a covering that can be removably disposed in an opening 54 of the compartment 32 to allow access to the electrodes 16. The cap 52 may be secured within the opening 54 to secure the electrodes 16 within the compartment 32, and the cap 52 may be removed to facilitate loading and unloading of the electrodes 16.

In the illustrated embodiment, the power supply 20 may route heated air through the compartment 32 to heat and dry the electrodes 16 stored therein. A fan (not shown) may draw ambient air into the power supply 20 via an intake 56 (e.g., in a front panel of the power supply 20, as shown) and direct the air over the circuitry 30 of the power supply 20. The circuitry 30 generally heats up during welding operations, so the relatively cool air blown over the circuitry 30 transfers heat from the circuitry 30 to the air. A portion (or all) of the heated air may be redirected into the compartment 32 to heat the electrodes 16 before exiting the power supply 20 via an exhaust 58 (e.g., in a side panel of the power supply 20, as shown). The exhaust 58 may be positioned such that the exhausted hot air is not recycled back through the intake 56. In the illustrated embodiment, for example, the exhaust 58 includes louvers along a side of the power supply 20, and the louvers are positioned substantially far away from the intake 56 at the front of the power supply 20. In addition, the exhaust 58 is oriented in a direction substantially perpendicular to the air intake 56. The louvers may keep particulate or other contaminants from entering the compartment 32 where the electrodes 16 are stored. Although the illustrated embodiment shows the compartment 32 as internal to the power supply 20, in other embodiments, the compartment 32 may be attached to an external portion of the power supply 20, and a structure of the power supply 20 may route the hot air into the attached compartment 32.

Figure 3:
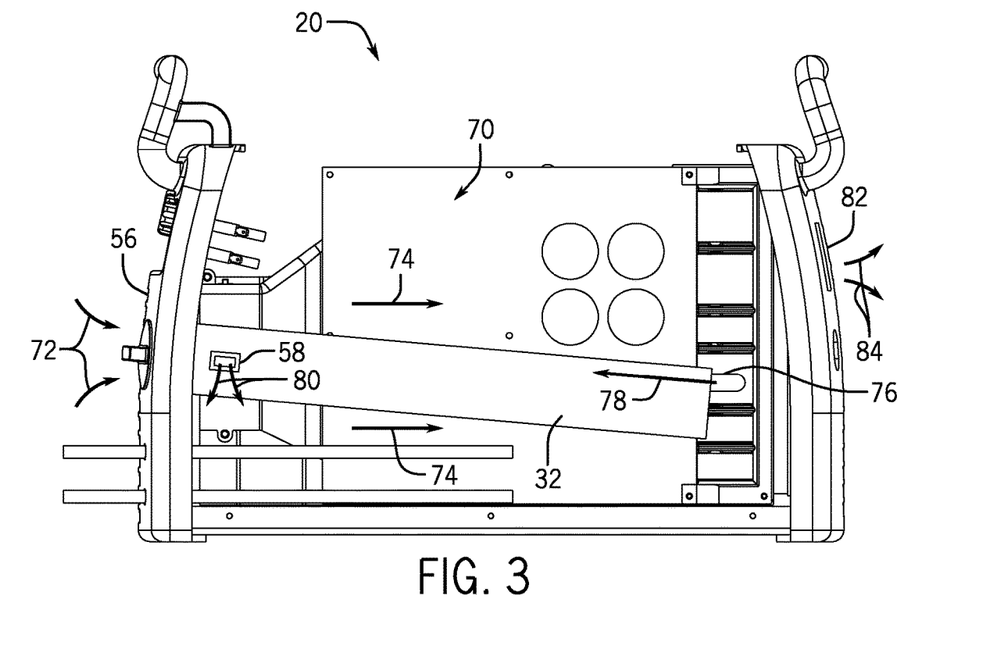
FIG. 3 is a side view of an embodiment of components of the power supply of FIG. 2.

FIG. 3 provides a more detailed side view of the power supply 20 of FIG. 2. In particular, FIG. 3 illustrates a side view of the power supply 20 with the outer housing removed for illustration purposes. Again, the compartment 32 includes a tube configured to hold the electrodes 16, and the compartment 32 may be internal to the power supply 20. However, the compartment 32 is external to a wind tunnel 70, or cabinet, of the power supply 20. The wind tunnel 70 may generally encompass the circuitry 30 of the power supply 20. The wind tunnel 70 may include any enclosure or area within the power supply 20 through which air is directed over the circuitry 30 of the power supply 20. A fan located inside the wind tunnel 70 may urge air movement over the circuitry 30 before the air is routed to the compartment 32 for drying the electrodes 16. The air may enter through the intake 56 (arrows 72) and flow through the wind tunnel 70 (arrows 74) over the circuitry 30. A directing structure, which is a scoop 76 in the illustrated embodiment, may redirect at least a portion of the heated air to a first end of the compartment 32 (arrow 78). This portion of air may travel through the compartment 32 and exit via the exhaust 58 (arrows 80) at an opposite end. In some embodiments, the heated air may flow through an annular region of the compartment 32 surrounding the hollow cylinder of the compartment 32. In other embodiments, the heated air may flow directly through the hollow cylinder and over the electrodes 16 in the compartment 32. In either instance, the portion of the compartment 32 that receives the heated air may be insulated from other components (e.g., circuitry 30) of the power supply 20. Any air that is not directed to the compartment 32 via the scoop 76 may exit the power supply 20 via a main exhaust 82 (arrows 84) (e.g., in a rear panel of the power supply 20, as shown).

It should be noted that any desirable structure may be utilized in addition to or in lieu of the illustrated scoop 76 to direct heated air into the compartment 32. Although the illustrated scoop 76 includes a cross section that is relatively small compared to a height of the wind tunnel 70 through which the air moves, other types and sizes of scoops 76 may be employed. For example, in other embodiments, the directing structure may be configured to direct substantially all of the air (e.g., greater than approximately 99% of the air, or accounting for any air leaks) from the wind tunnel 70 to the compartment 32, such that almost none of the air exits the power supply via another exhaust (e.g., main exhaust 82). That is, the directing structure may include the scoop 76 with a relatively large surface area for directing the air into the compartment 32, or the directing structure may include a duct that routes the air to the compartment 32. It may be desirable to position the scoop 76 or other directing structure such that the hottest portion of air flowing through the wind tunnel 70 is directed into the compartment 32. That is, the scoop 76 may be positioned immediately adjacent a circuit board that substantially increases in temperature during operation of the power supply 20. In this way, more heat may be provided to the compartment 32 for drying the stored electrodes 16.

Figure 4:
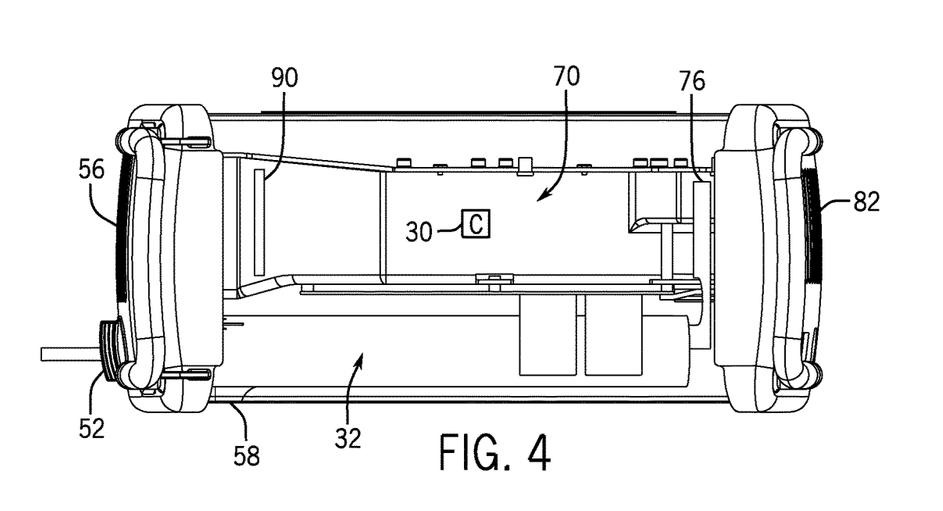
FIG. 4 is a top view of an embodiment of components of the power supply of FIG. 2.

FIG. 4 is a top view showing internal components of the power supply 20 of FIGS. 2 and 3. In particular, FIG. 4 illustrates a top view of the power supply 20 with the outer housing removed for illustration purposes. Again, in the illustrated embodiment, the wind tunnel 70 is an enclosure located separately from the compartment 32. This separation may be useful for accommodating all the internal components of the power supply 20 within a desired space. As noted above, a fan 90 directs the air through the wind tunnel 70 and over the circuitry 30 to heat the air. The circuitry 30 may include various circuit boards and heat sinks from which heat needs to be removed during operation. The fan 90 may be located at any desired point along the length of the wind tunnel 70 to draw the air through the wind tunnel 70 and push heated air through the compartment 32.

There may be a maximum temperature threshold above which the electronics of the power supply 20 cannot operate. If the circuitry 30 reaches a temperature above the threshold, the electronics or other internal components may cease to function properly. This temperature threshold may be approximately 180° F. The air flowing through the wind tunnel 70 may be used to keep the temperature of the circuitry 30 below this threshold. As a result, the heated air that exits the wind tunnel 70 (e.g., to the compartment 32) is generally less than the threshold temperature. Depending on the type of electrodes 16 stored in the compartment, the temperature of the heated air may or may not be high enough to fully dry out the electrodes 16. For example, some types of electrodes 16 may be fully dried when they are heated to a temperature of approximately 120° F. Certain commonly used electrodes, including E-6010 and E-6011 electrodes, may be fully dried when heated to a temperature of less than 180° F. However, other types of electrodes 16, such as E-7018 electrodes, may be fully dried only when heated to a temperature of approximately 200° F. or higher. Therefore, the heated air blown through the compartment 32 may not provide enough heat to fully dry certain electrodes 16. Therefore, in some embodiments, it may be desirable to utilize a different or supplemental heat source (integral with the power supply 20) in the electrode drying system to promote full drying of all types of electrodes 16.

Figure 5:
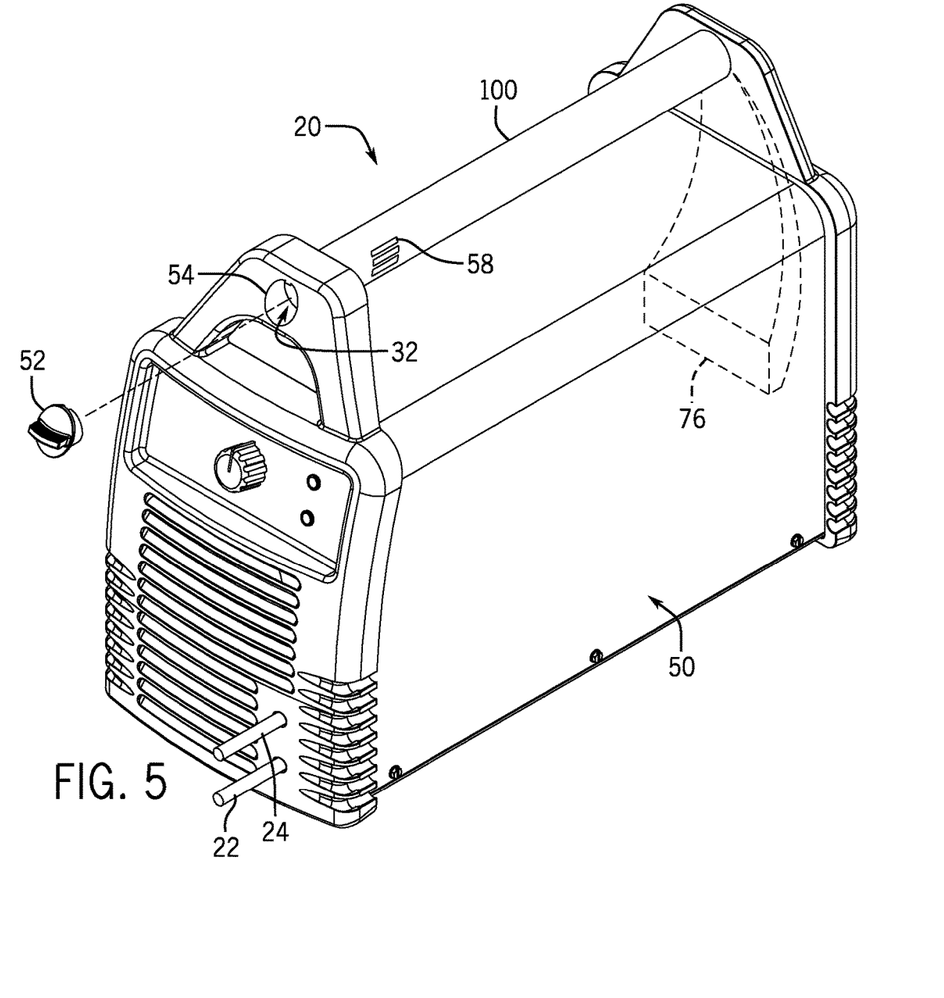
FIG. 5 is a perspective view of an embodiment of the power supply of FIG. 1.

FIG. 5 is a perspective view of an embodiment of the power supply 20 that uses heated air to dry the electrodes 16 in the compartment 32 of the power supply 20. In this embodiment, the compartment 32 is disposed in a handle 100 of the power supply 20. The handle 100 extends along the length of the power supply 20, and the handle 100 may facilitate lifting and carrying of the power supply 20 to and from a worksite. This arrangement may allow more room within the body 50 for arranging the circuitry 30 and other internal components of the power supply 20. In addition, the components internal to the body 50 may be arranged more efficiently, possibly reducing the total weight of the power supply 20. The illustrated embodiment shows the same arrangement of the cap 52 configured to close the opening 54 as described in relation to FIG. 2. The power supply 20 may include a directing structure (e.g., scoop 76) to redirect a portion of heated air from the wind tunnel 70 up into the compartment 32 of the handle 100. The handle 100 may include the exhaust 58 (e.g., louvers) for outputting the hot air to the atmosphere. Air is generally directed through the power supply 20 (via a fan) as described above with reference to FIG. 3. For the embodiments described in FIGS. 2-5, the compartment 32 may be located in any desired configuration and position integral with the power supply 20, such that air blown over the circuitry 30 of the power supply 20 is directed to the compartment 32.

As noted above, it may be desirable in some embodiments to include a supplemental or different heating arrangement for heating and drying the electrodes 16 stored in the compartment 32. In such embodiments, the power supply 20 may be configured to provide the additional heating without using an additional source of power. That is, the power supply 20 may be configured to output welding power and to dry the additional electrodes 16 using power from the single power source 28. One such embodiment is illustrated in FIG. 6, which is a diagrammatic representation of the power supply 20 with an integral electrode drying system.

Figure 6:
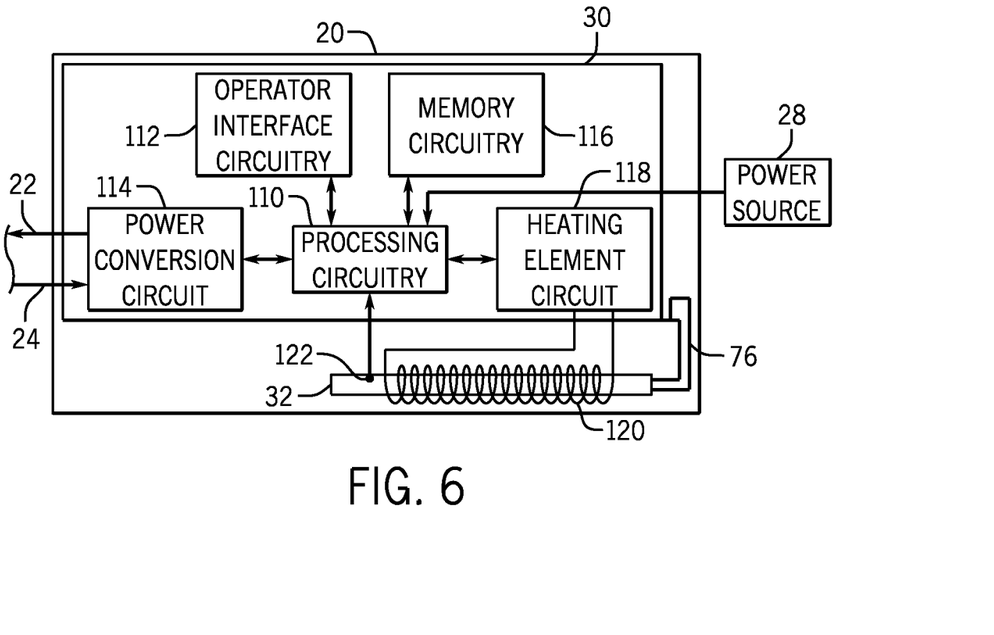
FIG. 6 is a diagrammatical representation of an embodiment of the power supply of FIG. 1.

FIG. 6 shows an arrangement of the circuitry 30 that may be provided in the power supply 20. The circuitry 30 may include processing circuitry 110 to perform control functions based on various inputs. The circuitry 30 may also include operator interface circuitry 112 which communicates operator inputs from input devices (e.g., dials, digital keypad) of the power supply 20 to the processing circuitry 110. These operator inputs may include, for example, a desired welding power output for the power supply 20, polarity, various weld parameters, fan speed of the fan 90, and other information. The processing circuitry 110 may provide control signals to a power conversion circuit 114 to provide the appropriate welding power via the weld cables 22 and 24. Memory circuitry 116 may include instructions, routines, and settings that are accessible via the processing circuitry 110 for carrying out various control functions. In the illustrated embodiment, the circuitry 30 also includes a heating element circuit 118 to provide heating to dry the electrodes 16 stored in the compartment 32. The heating element circuit 118 may respond to control signals from the processing circuitry 110 by outputting heating power to a heating element 120 located proximate the compartment 32. The heating element 120 may include a resistive heating coil, a light bulb, a power resistor, an inductive heating coil, or any other desirable component that converts electrical power into heat. For example, the heating element 120 may include a resistive or inductive heating coil wrapped around the compartment 32. In an embodiment where the heating element 120 includes a light bulb, the light bulb may be located inside the power supply 20 and generally adjacent to the compartment 32. In some embodiments, the heating element 120 may include multiple light bulbs positioned adjacent to the compartment 32, along a length of the compartment 32 or around a width of the compartment 32.

As described above, it may be desirable for the power supply 20 to include the heating element 120 and corresponding heating element circuit 118 to supplement the heating available through the heated air embodiment described above. That is, the power supply 20 may include the fan 90, the scoop 76, and the wind tunnel 70 along with the heating element 120. Depending on the duty cycle of the power supply 20, the power supply 20 may output welding power intermittently. The processing circuitry 110 and power conversion circuit 114 may not generate a significant amount of heat during down times. As a result, the air blown over the circuitry 30 via the fan 90 may not reach a desired temperature for drying the electrodes 16. The heating element 120 may produce heat to supplement the heat input to the compartment 32 through the moving air during such down times.

In some embodiments, the processing circuitry 110 may direct power from the power source 28 to the heating element circuit 118 only when the welder is not outputting welding power (e.g., the power conversion circuit 114 is open). That is, when welding power is flowing through the power conversion circuit 114, the processing circuitry 110 may switch the heating element circuit to open, so that no additional heating is provided during welding. In other embodiments, the heating element 120 may provide additional heat to the compartment 32 throughout operation and downtime of the power supply 20. This may be particularly useful for maintaining a desired temperature for drying electrodes 16 (e.g., E-7018 electrodes) at a relatively higher temperature. In still other embodiments, the power supply 20 may utilize feedback from a temperature sensor 122 disposed in the compartment 32, or upstream of the compartment 32 (e.g., in the wind tunnel 70 or the scoop 76). The processing circuitry 110 may control the heating element circuit 118 and/or the fan 90 to maintain the temperature of the compartment 32 within a desired range for drying the electrodes 16. For example, in some embodiments, the fan 90 may always operate to cool the electronics while the power supply 20 outputs welding power, and the heating element 120 may provide additional heat as desired based on the sensed temperature. The speed of the fan 90 may be controlled as well, to provide proper cooling to the circuitry 30 and to provide a desired amount of heat input to the compartment 32 for heating the stored electrodes 16. In some embodiments, the fan speed may be selected by an operator via the operator interface 112. Specifically, a desirable fan speed may be selected from any number of selectable fan speeds available for the operator to input via a knob or other input device. In other embodiments, the fan speed may be controlled based on an amount of heat available from the circuitry 30 during an operator-input welding application.

Figure 7:
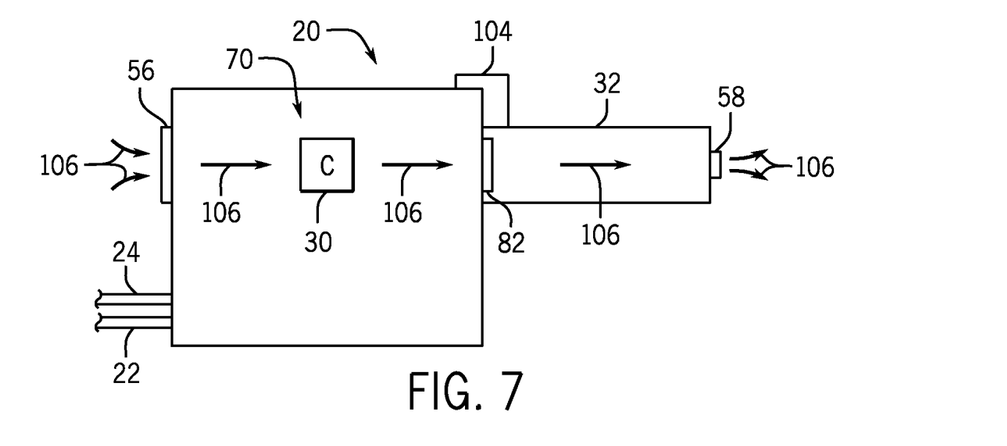
FIG. 7 is a diagrammatical representation of an embodiment of a welding power supply used to dry electrodes in a compartment attached to the power supply.

In each embodiment illustrated in FIGS. 1-6, the compartment 32 is located inside the power supply 20. However, it may be desirable in certain contexts to have the compartment 32 as a feature that is attachable and detachable to and from an external portion of the power supply 20. Such a compartment 32 may be transportable to and from a worksite, but may also be configured to utilize heat from the power supply 20 for drying the electrodes 16 stored therein. FIG. 7 is a diagrammatical representation of one such embodiment of the welding system 10. The compartment 32 may be attached to the outer portion (e.g., back panel) of the power supply 20 via an attachment feature 104. This attachment feature 104 may include a bracket, hanger, mount, clamp, straps, or any other suitable attachment mechanism specially designed to attach the compartment 32 to an exterior portion of the power supply 20. The attachment feature 104 may be built into the compartment 32, the exterior portion of the power supply 20, or both. In the illustrated embodiment, the attachment feature 104 includes a bracket disposed on an outer corner of the power supply and configured to hold the compartment 32 against the power supply 20. In some embodiments, the compartment 32 may be an accessory that can be incorporated with any available power supply 20.

The power supply 20 may provide heat for drying electrodes in the attached compartment 32. To facilitate this, the compartment 32 may be attached to the power supply 20 at a position adjacent the main exhaust 82 of the power supply 20. Thus, heated air exiting the power supply 20 through the main exhaust 82 may enter an opening in the compartment 32 to heat the electrodes. As discussed above, the heated air may exit the compartment 32 via the exhaust 58. The flow of air is generally depicted in FIG. 7 via arrows 106. In such embodiments, the power supply 20 may not include the scoop 76, or any other air directing structure, as the compartment 32 is configured to receive the air coming directly out of the power supply 20. In some embodiments, the compartment 32 may be configured to fit entirely over the main exhaust 82, as shown, so that substantially all of the heated air exiting the wind tunnel 70 may be used to heat and dry the electrodes 16. Other embodiments of the attachable compartment 32, which utilizes heated air from the power supply 20 to dry electrodes 16, may be possible as well.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. A welding system, comprising:
a welder configured to output power to form an arc between a stick electrode and a workpiece, wherein the welder comprises:
 a compartment configured to receive and store additional stick electrodes;
 an air intake disposed at a first end of the welder;
 a fan configured to direct air through the air intake from the first end of the welder to a second end of the welder across circuitry of the welder, wherein heat is dissipated from the circuitry into the air;
 a redirecting structure configured to direct a portion of the heated air through the compartment from the second end of the welder toward the first end of the welder to heat the additional stick electrodes; and
 an exhaust disposed at the first end of the welder and configured to output the air from the welder.
2. The welding system of claim 1, wherein the welder is configured to heat the additional stick electrodes via convective heat transfer.

3. The welding system of claim 1, wherein the welder comprises a heating element disposed proximate the compartment to heat the additional stick electrodes.

4. The welding system of claim 3, wherein the heating element comprises a resistive heating coil.

5. The welding system of claim 3, wherein the heating element comprises a light bulb.

6. The welding system of claim 1, comprising a single power source to provide operational power to the welder for outputting welding power and for heating the additional stick electrodes.

7. The welding system of claim 1, wherein the compartment is internal to a body of the welder.

8. The welding system of claim 1, wherein the compartment is internal to a handle of the welder.

9. The welding system of claim 1, wherein the compartment is attached to an external portion of the welder.

10. The welding system of claim 1, wherein the welder comprises control circuitry configured to control heat input to the additional stick electrodes stored in the compartment based on temperature sensor feedback.

11. A welder, comprising:
a fan configured to direct air into a cabinet of the welder through an air intake disposed at a first end of the welder, through the cabinet of the welder, from the first end of the welder to a second end of the welder, wherein the cabinet encompasses circuitry for operating the welder;
a compartment configured to store welding electrodes;
a structure configured to direct a portion of the air from the cabinet through the compartment from the second end of the welder toward the first end of the welder to heat the welding electrodes stored in the compartment; and
an exhaust disposed at the first end of the welder and configured to output the air from the compartment.

12. The welder of claim 11, wherein the structure is configured to direct substantially all of the air from the cabinet to the compartment.

13. The welder of claim 11, wherein the compartment is internal to the welder.

14. The welder of claim 11, comprising a heating element disposed proximate the compartment and configured to heat the welding electrodes stored in the compartment.

15. The welder of claim 14, wherein the welder is configured to heat the welding electrodes via the heating element when the welder is not outputting welding power.

16. The welder of claim 14, wherein the welder is configured to provide supplemental heat to the welding electrodes via the heating element based on temperature sensor feedback.

17. A method, comprising:
receiving one or more electrodes into a compartment of a SMAW power supply;
directing air into a cabinet of the SMAW power supply through an air intake disposed at a first end of the SMAW power supply, through the cabinet of the SMAW power supply, from a first end of the SMAW power supply to a second end of the SMAW power supply, via a fan;
transferring heat to the air from circuitry disposed in the cabinet of the SMAW power supply to produce heated air;
redirecting the heated air through the compartment from the second end of the SMAW power supply toward the first end of the SMAW power supply;
drying the one or more electrodes in the compartment via heat from the SMAW power supply; and
outputting the air from the SMAW power supply through an exhaust disposed at the first end of the SMAW power supply.

18. The method of claim 17, comprising drying the one or more electrodes via a heating element disposed proximate the compartment and operated via the SMAW power supply, wherein the SMAW power supply comprises the heating element.

* * * * *